(No Model.) 2 Sheets—Sheet 2.

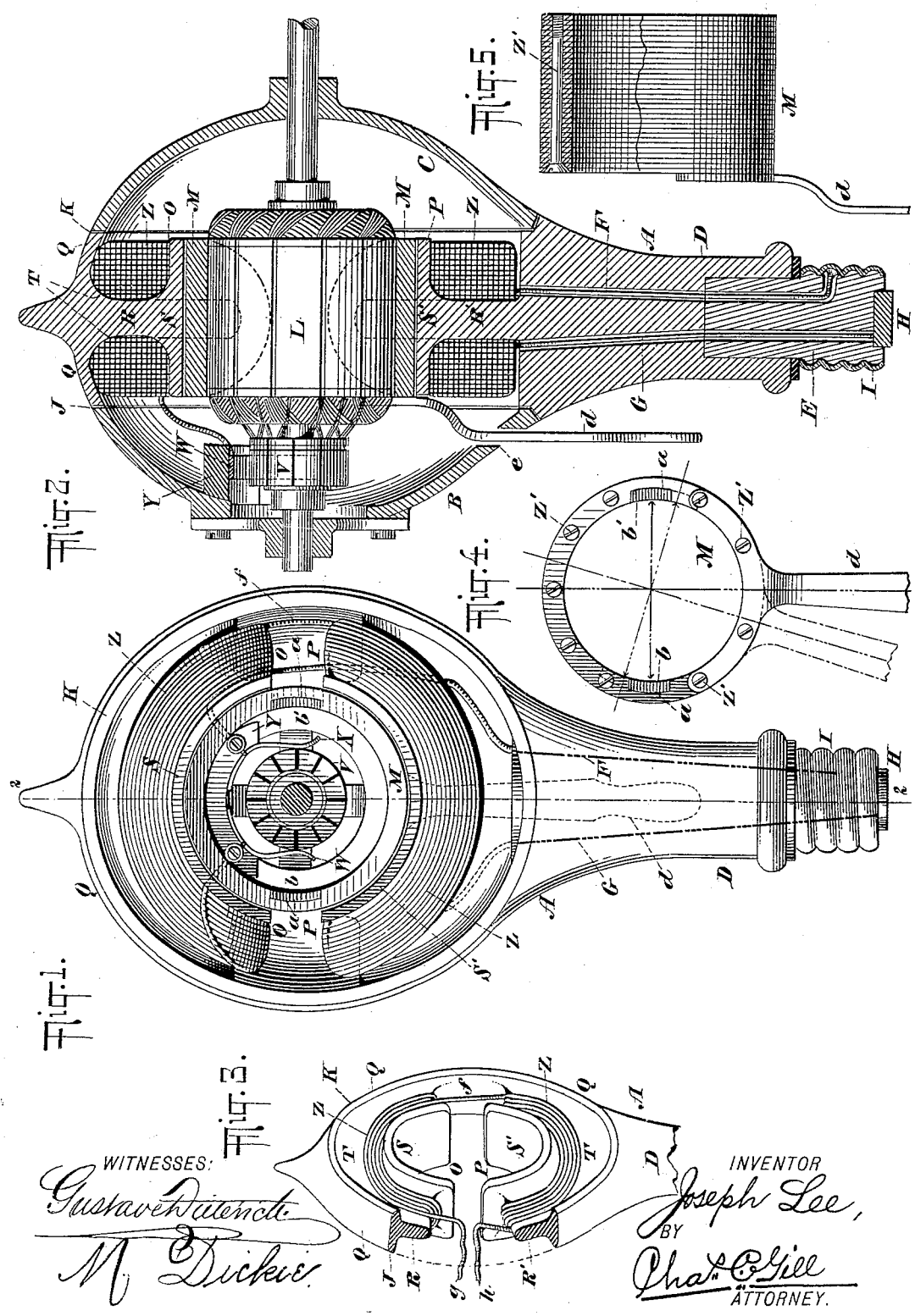

J. LEE.
ELECTRIC MOTOR.

No. 521,799. Patented June 26, 1894.

WITNESSES:
Gustave Dieterich
M. Dickie

INVENTOR
Joseph Lee,
BY Chas. C. Gill
ATTORNEY.

UNITED STATES PATENT OFFICE.

JOSEPH LEE, OF BROOKLYN, NEW YORK.

ELECTRIC MOTOR.

SPECIFICATION forming part of Letters Patent No. 521,799, dated June 26, 1894.

Application filed August 2, 1893. Serial No. 482,168. (No model.)

*To all whom it may concern:*

Be it known that I, JOSEPH LEE, a subject of Her Majesty the Queen of Great Britain, and a resident of Brooklyn, in the county of Kings and State of New York, United States of America, have invented a new and useful Electric Motor, of which the following is a specification.

The invention relates to improvements in electric motors or dynamos, and consists more particularly in the novel field magnets and the windings thereon, the frame supporting the field magnets and inclosing the brushes and revoluble armature and commutator, the ring or speed regulator intermediate the armature and field magnets, and the several features and combinations hereinafter described and claimed.

The object of the invention is to improve the form and construction of electric motors, to attain increased efficiency therein, and by very simple and effective means to enable the speed of the armature of each motor to be independently regulated at will.

The invention will be more fully understood from the detailed description hereinafter presented, reference being had to the accompanying drawings, in which—

Figure 6:
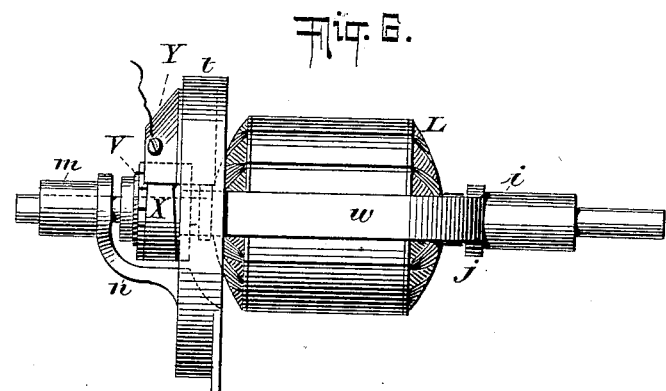
Figure 7:
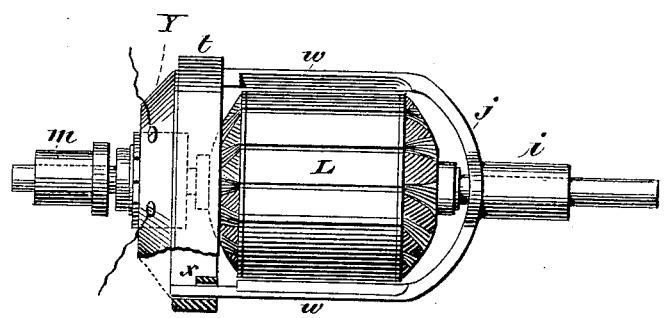
Figure 8:
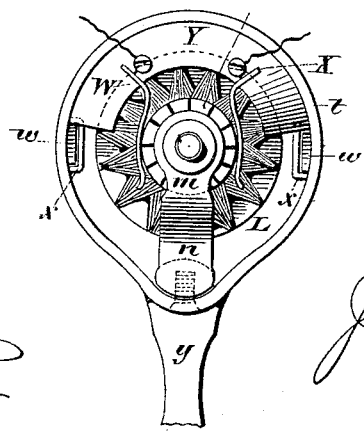

Figure 1 is a side elevation of an electric motor constructed in accordance with and embodying the invention, one face plate or cap of the motor casing being removed for clearness of illustration, and the armature shaft being illustrated in section. Fig. 2 is a central, vertical, longitudinal section of same on the dotted line 2—2 of Fig. 1. Fig. 3 is a detached perspective view, partly broken away and on a reduced scale, of the middle section of the motor frame supporting the field magnets and illustrating more particularly the method of winding the conducting coils on the cores to form the electro-magnets. Fig. 4 is a detached plan view of the ring or speed regulator located between the field magnets and revoluble armature. Fig. 5 is a side elevation, partly broken away, of same; and Figs. 6, 7 and 8 are side, top and end views respectively of a modified construction of a portion of the electric motor and designed for use more particularly when the side faces or caps of the inclosing frame are of glass and not conveniently capable of supporting the bearings for the armature shaft.

In the drawings the letters A, B, C, respectively designate the inclosing and supporting frame of the electric motor, the portion A forming the central part of the said frame and being cast preferably integral with the lower elongated neck D, which receives at its lower end the threaded plug E of non-conducting material and is provided with perforations to permit the passage of the conductors lettered F, G, respectively.

The plug E may be of wood or other non-conducting material and supports in its lower end the copper button or other contact H, which is in electrical connection with the conductor G and is adapted (when by the means of the exterior threaded surface of the plug E or the lower end of the neck D the electric motor is secured in its socket in operative position) to be placed in contact with one of the usual conductors supplying the current.

Upon the exterior surface of the plug E is screwed the sheet metal threaded sleeve I which, as indicated in Fig. 2, is in direct contact with the conductor F, and is itself adapted for contact with the other of the usual conductors supplying the current. The central portion A of the frame at its upper portion describes substantially a circle, and is formed on opposite sides with the shoulders J, K, respectively, which receive the inner edges of the faces or caps B, C, constituting the opposite sides of the motor frame. The caps B, C, at their inner edges are substantially cylindrical in outline and when applied to the central portion A constitute with said portion A a globular frame within which are the revoluble armature L, ring or speed regulator M and electro-magnets O, P, the shaft of the armature constituting the driving shaft and being supported at its ends in the caps B, C, as indicated in Fig. 2.

The central portion A of the frame is provided with the exterior lateral flanges Q, Q, and the vertical core flanges R, R′, extending inward toward each other and carrying the circular plates or flanges S, S′, which, when wound with the conducting coils constitute the electro-magnets, concentric with and located one above and the other below the armature. The method of winding the conducting coils on the cores R, R′ to form the electro magnets is a feature of importance and will be presently explained. It will be seen that between the flanges S, S′ and Q, Q, there are formed on opposite sides of the vertical cores R, R′, the recesses T adapted to receive the coils Z, Z, for the electro-magnets, and that upon the removal of the caps B, C, the armature, speed regulator and coils are fully exposed to view.

The armature L may be of any suitable construction, but I recommend the use of the well-known Siemen's armature having upon its shaft the commutator V adapted for contact with the brushes W, X, supported by the brush holder Y of non-conducting material. The brushes W, X, may be of any suitable form or construction, and they constitute the means for forming the usual short circuit through the commutator.

The end of the shaft of the armature L opposite to that carrying the commutator V extends through the cap or face C, and is adapted to carry a fan or other mechanism in accordance with the uses to which it is intended to apply the power.

The speed regulator M is a ring or sleeve about equal in width to that of the magnets O, P, and incloses the armature L, as indicated in Fig. 2. The regulator M is preferably composed of thin metallic rings banked one upon the other with paper or other insulating material between them, the whole being secured together by screws Z′ to constitute the solid sleeve or ring of the proper width.

While I recommend that the laminated regulator sleeve or ring, illustrated in Fig. 5, be made use of, since better results may be secured thereby, I do not confine the invention solely to a regulator M so constructed or made of a number of sections. The regulator M is grooved at $a, a$, upon its opposite inner sides to receive the brass plates $b, b'$, shown in Fig. 4, the line between these plates $b, b'$ constituting the neutral line; and the said speed regulator M is provided with a switch handle $d$ which projects downward through a slot $e$ formed in the cap or face B and is utilized when moved from one side to the other for the purpose of imparting a rotary movement to the regulator without removing the latter from the position between the field magnets and the armature, the purpose of this rotary movement being to increase or decrease the speed at which the armature and the mechanism connected therewith shall revolve. By moving the handle $d$ in one direction the speed of the armature will increase, and by moving it in the opposite direction the speed thereof will diminish, and hence it is plain that the speed may be regulated at will. To lessen the speed of the armature the handle $d$ should be moved to the left, as shown by dotted lines in Fig. 4, thus changing the relation of the neutral line through the plates $b, b'$, and moving the south of the regulator toward the north or magnet O, and to increase the speed of the armature the handle $d$ should be moved to the right from its normal position, thus revolving the regulator in a reverse direction and drawing the north of same toward the south or magnet P. When the neutral line through the regulator M is centrally on a transverse line between the field magnets, the armature will revolve at the standard or predetermined speed, and the purpose of the regulator is to enable the user of the motor to vary this speed at will. The regulator M will not materially increase the cost of the motor, and is easy of operation and effectual for the purposes intended for it.

The method of winding the field magnets O, P, is illustrated in Figs. 1 and 3, in which it will be noticed that the wire is continuous and wound in the same direction, the winding of the upper magnet being accomplished by carrying the wire around and around the core R starting from the outer or one side thereof, whence the wire is carried downward (close to the edge of the flange Q, as shown at $f$) to the inner or opposite side of the lower core R′ and wound around and around the latter a sufficient number of times. The two ends $g, h$ of the wire forming the coils Z, Z (see Fig. 3) coming from one side of the core R and the opposite side of the core R′ are then connected respectively with the brush W and conductor G. The conductor F at its upper end is in electrical connection with the brush X.

The motor with its parts arranged as described above and as illustrated in the accompanying drawings is ready to be placed in operative position with the contacts H, I, thrown into electrical connection with the supply conductors, at which time one current will pass through the conductor F to the brush X and the other current will pass through the conductor G and coils Z, Z, to the brush W, the circuit being completed through the commutator in the usual manner. The parts of the motor being in position and the armature in motion, the armature shaft may be utilized for any of the known purposes of electric motors.

As above described the speed of the armature and its shaft may be varied by moving the switch handle $d$ from its central position, thus changing the relation of the neutral line through the regulator M with respect to the poles of the magnets O, P.

In Figs. 1 and 2 I illustrate the arrangement of the armature shaft that will be found convenient when the faces or caps B, C, of the motor frame or casing are of metal and capable of furnishing the bearings for the shaft, but I propose in many instances to form the faces or caps B, C, of glass and at such time the bearings for the armature shaft will be provided for in the manner shown in Figs. 6, 7 and 8, in which it is shown that the armature shaft is supported at one end by a sleeve $i$ formed on the bifurcated frame $j$, and at the other end by a sleeve $m$ supported by a bar $n$ from the ring $t$ carried on the ends of the arms $w$ of said frame $j$. The arms $w$ of the frame $j$ straddle the armature L longitudinally and support the speed regulator M by passing through the grooves $a, a$, therein, the plates $b, b'$, being under the modified arrangement omitted and the arms $w$ serving as substitutes therefor. The ring $t$ has loops $x$ to receive the ends of the arms $w$ and at its lower portion is recessed to receive or form a seat for the lower end of the arm or bar $n$. The brush holder Y is secured in the upper part of the ring $t$, as shown more clearly in Fig. 8.

In arranging the parts of the mechanism shown in Figs. 6, 7 and 8, the arms $w$ are inserted through the grooves $a, a$, of the speed regulator M, thus bringing the latter to position, and then the armature is inserted into the regulator M with one end of its shaft protruding through the sleeve $i$, after which the ring $t$ is placed on the ends of the arms $w$ in the position shown; the brush holder and brushes are placed, and the sleeve $m$ slipped on the end of the shaft and the lower end of the arm or bar $n$ secured in its seat on the lower part of the ring $t$. The ends of the armature shaft under the conditions illustrated in Figs. 6, 7 and 8, are relieved from all bearing or strain on the faces or caps B, C, and hence the latter may be of glass, which being transparent will beautify the appearance of the motor and at all times permit an inspection of the interior mechanism thereof.

In order to operate the regulator M under the conditions shown in Figs. 6, 7 and 8, the ring $t$ is provided with the switch handle $y$, which, when moved to either the left or right after the manner of the handle $d$ shown in Figs. 1, 2 and 4, will cause the ring $t$, frame $j$, regulator M, brush holder Y and brushes W, X, to be revolved, with the effect of increasing or decreasing the speed of the armature, as above set forth.

In the arrangement of the regulator M shown in Figs. 1 and 2 the movement of the handle $d$ causes the regulator alone to rotate, but with the construction illustrated in Figs. 6, 7 and 8, the movement of the handle $y$ causes the regulator M to revolve in the magnetic field and the brushes W, X, to have a like movement over the surface of the commutator.

When the regulator M and brushes W, X, are arranged to have a corresponding and simultaneous movement from the switch handle, as shown in Figs. 6, 7 and 8, the movement of the said handle to secure the increase or reduction in the speed of the armature L need not be so great as when the regulator M moves independently of the brushes.

What I claim as my invention, and desire to secure by Letters Patent, is—

1. In an electric motor or dynamo, the central frame A having the interior curved electro magnets O, P, and the removable caps B, C, fitting the opposite sides of and closing said frame, combined with the ring speed regulator M about equal to the width of said electro-magnets and having the exposed switch handle $d$, the armature L inclosed within said regulator M, and the inclosed commutator and brushes; substantially as and for the purposes set forth.

2. In an electric motor or dynamo, the elongated electro-magnets having the cores and curved facing flanges, combined with the revoluble ring speed regulator M in the magnetic field and having at its opposite sides the grooves $a, a$, and plates $b, b'$, the revoluble armature L within said regulator, the commutator and brushes, and the inclosing frame of the motor; substantially as and for the purposes set forth.

3. In an electric motor or dynamo, the central frame A having the interior curved cores R, R', and facing flanges S, S', extending toward but not meeting each other, and the conductor on said cores, combined with the revoluble armature L within the circle of the electro magnets, the commutator and brushes, and the hollow caps B, C, fitting the opposite sides of said central frame A and inclosing the operative parts; substantially as and for the purposes set forth.

4. In an electric motor or dynamo, the elongated electro magnets having the cores and curved facing flanges, combined with the hollow speed regulator in the magnetic field, the revoluble armature within said regulator, the commutator and brushes, the conductor being wound around from the obverse to the reverse face of one of said cores and from the reverse to the obverse face of the other of said cores; substantially as set forth.

5. In an electric motor or dynamo, the frame consisting of the central portion A and removable caps B, C, said portion A having the interior elongated curved facing electro magnets and the downwardly extending neck D, combined with the revoluble armature within the circle of the electro-magnets, the commutator and brushes, and the contacts for the supply current at the lower end of said neck; substantially as set forth.

6. In an electric motor or dynamo, the frame consisting of the central cast metal portion A and removable caps or faces B, C, said portion A having the exterior flanges Q, the elongated electro magnet cores and curved facing flanges, and the downwardly extending neck D receiving the conductors, combined with the revoluble armature within the circle of the magnets, and the commutator and brushes; substantially as set forth.

Signed at the city of New York this 31st day of July, 1893.

JOSEPH LEE.

Witnesses:
W. H. MACKAY.
CHAS. C. GILL.